Sept. 22, 1964  A. HULSE  3,149,494
OSCILLATOR MECHANISM
Filed May 19, 1961
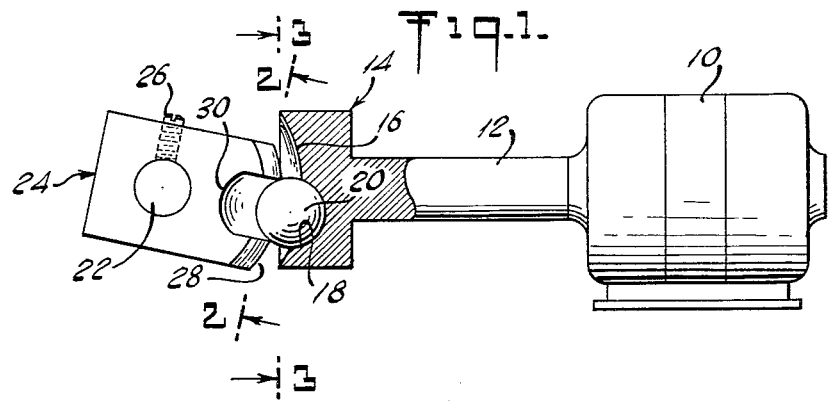
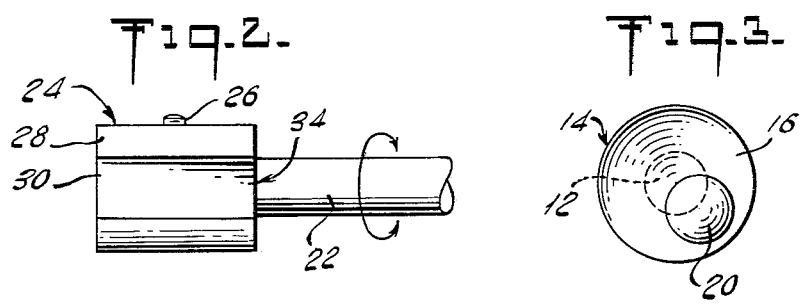
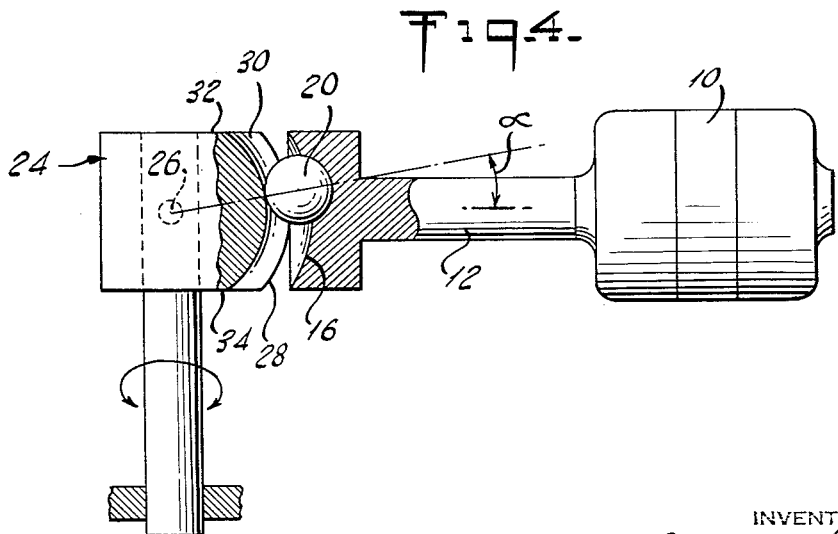
INVENTOR
ALEXANDER HULSE
BY
McGlew and Toren
ATTORNEYS United States Patent Office 3,149,494
Patented Sept. 22, 1964

1

3,149,494
OSCILLATOR MECHANISM
Alexander Hulse, 166 Vanderbilt Ave.,
Staten Island 4, N.Y.
Filed May 19, 1961, Ser. No. 111,285
5 Claims. (Cl. 74—47)

This invention relates in general to driving mechanisms and in particular to a new and useful compact mechanism for effecting the controlled oscillation of a member such as a shaft.

Prior to the present invention it has been known to employ mechanisms such as a swinging follower cam for complex linkage mechanisms for effecting the timed or controlled oscillation of a shaft in an operating machine. A disadvantage of such a mechanism is the expense of manufacture of the same and the difficulty of incorporating it in very small or compact devices, such as electrical shavers, computers, phonographs and control mechanisms, etc.

In accordance with the present invention, there is provided a simple mechanism which may be made very compact and which includes a minimum of parts for effecting the controlled oscillation of a member in an operating device. The arrangement includes a block member or oscillator which is secured to an output shaft or member requiring oscillation and which is provided with a curved groove defined in the peripheral outer portion which is advantageously curved in a direction parallel to the axis of oscillation of the member being oscillated. The input or driving member includes a crank or plate member which eccentrically carries a spherical member, such as a steel ball. The driving member and the oscillator member are arranged together so that the ball is confined in the groove of the oscillator member. The plate member is mounted on an input shaft with the steel ball eccentric to the axis of the shaft so that rotation of the input shaft causes movement of the steel ball backwardly and forwardly in the groove of the oscillator member and effects, at the same time, a controlled oscillation of the output shaft depending on the relative locations and sizes of the groove, steel ball and axes of the respective shafts.

Accordingly, it is an object of this invention to provide an improved oscillating mechanism.

A further object of the invention is to provide an oscillating mechanism including a crank member arranged on an input shaft which carries a member confined for movement in a groove of an oscillator member affixed to an output shaft to be oscillated wherein the input crank member is rotated to oscillate the shaft during the back and forward movement of the member in the groove.

A further object of the invention is to provide an oscillator mechanism which is simple in design, rugged in construction and economical to manufacture and may be made very compact.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a side elevation of an oscillating mechanism constructed in accordance with the invention;

FIG. 2 is an end elevation of the output shaft and oscillator blocks taken in the direction 2—2 of FIG. 1;

FIG. 3 is an end elevation of the crank member taken in the direction 3—3 of FIG. 1; and

2

FIG. 4 is a top plan view of the mechanism indicated in FIG. 1.

Referring to the drawings in particular, the invention embodied therein comprises an oscillating mechanism including a driving motor 10 having a shaft 12 upon which is mounted a disc or crank member generally designated 14.

In accordance with the invention, the disc member 14 is provided with a curved outer face 16 with a hemispherical recess 18 defined therein in which is positioned a spherical member, such as a steel ball 20.

A shaft 22 to be oscillated is provided with an oscillator block member generally designated 24. The block member 24 is affixed to the shaft as by means of a set screw 26 which is threaded through one end thereof. The block member 24 includes a curved peripheral surface 28 having a groove 30 defined therein which extends from side 32 to side 34.

The central axis of the steel ball 20 is disposed at an angle ($\alpha$) alpha from the axis of the shaft 12 so rotation of the shaft 12 effects rotation of the ball 20 around the shaft. The block member 24 is held by bearings 36 directly adjacent the crank member 14. Rotation of the shaft 12 and the crank member causes relative movement of the ball 20 along the groove 30 and effects oscillation of the block 24 and the shaft 22 which is affixed thereto.

The period of oscillation may be easily controlled depending on the angle $\alpha$ which the center of rotation of the steel ball makes with the axis of the shaft 12. For example, for an angle $\alpha$ of 10° an oscillatory movement of 20° of the shaft 22 is effected with the parts of the relative sizes indicated.

An advantage of the mechanism is that the crank plate, the steel ball and the block 24 may be made very small in size and without requiring difficult machining. Since it is usual to provide ball bearings in a large variety of precise sizes, the sizes of the various parts used in the mechanism may be readily changed and different size ball bearings employed to achieve different oscillatory periods, as desired. The mechanism will find particular application in small size operating machinery, such as electric shavers, computing mechanisms, such as adding machines, typewriters and the like.

While a specific embodiment of the invention has been shown and described in detail to illustrate the application of the inventive principles, it will be understood that the invention may be embodied otherwise without departing from such principles.

What is claimed is:

1. An oscillator comprising a crank member having an eccentrically rotatable part comprising a semi-spherical recess and a ball in said recess, and an oscillator affixed to a member to be oscillated including a slot in a peripheral face thereof in which said ball member is positioned, said slot having an arcuately extending curved surface and being elongated in a direction substantially transverse to the direction of oscillatable movement of said oscillator and being shaped to confine said ball between said oscillator and said crank member during all angles of rotative movement of said crank member whereby rotation of said crank member effects oscillation of said oscillator block.

2. An oscillator according to claim 1, wherein said block and said crank member have complementarily curved opposing faces.

3. An oscillator comprising a plate member attached to a rotatable shaft, said plate member having a hemispherical recess defined in an end face thereof at a location off center from the center of rotation thereof, a spherical ball in said recess, an oscillator adapted to be attached to a member to be oscillated about an axis of oscillation at substantially right angles to the axis of said shaft, said oscillator having an outer face with a curved surfaced groove extending therealong in a direction substantially parallel to said axis of oscillation, said groove curved surface being substantially concentric to the point of intersection of the juncture of an imaginary extension of the axis of rotation of said shaft and said axis of oscillation, said oscillator being held so that said spherical ball is confined in the groove of said oscillator block whereby the rotation of said plate member effects movement of said ball backwardly and forwardly along said groove to oscillate said oscillator block.

4. An oscillator according to claim 3, wherein said oscillator and said plate member have complementarily curved opposing faces.

5. An oscillator according to claim 3, wherein said oscillator includes a convexly curved outer surface, and said plate member having a complementarily concavely curved opposing surface.

References Cited in the file of this patent
UNITED STATES PATENTS

| | | |
|---|---|---|
| 1,480,586 | Willett | Jan. 15, 1924 |
| 2,439,262 | Nalbach et al. | Apr. 6, 1948 |
| 2,617,133 | Cocchiola | Nov. 11, 1952 |